Jan. 27, 1942.  P. DE MATTIA  2,271,019
INJECTION MOLDING MACHINE OR SIMILAR PRESS
Filed July 17, 1940  2 Sheets-Sheet 1
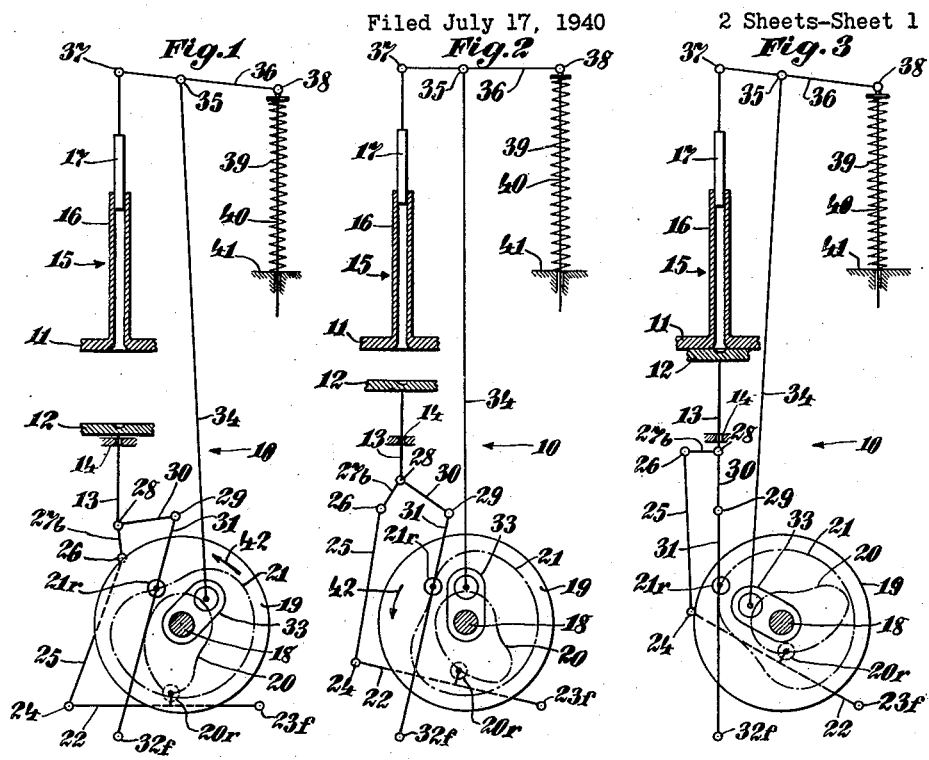
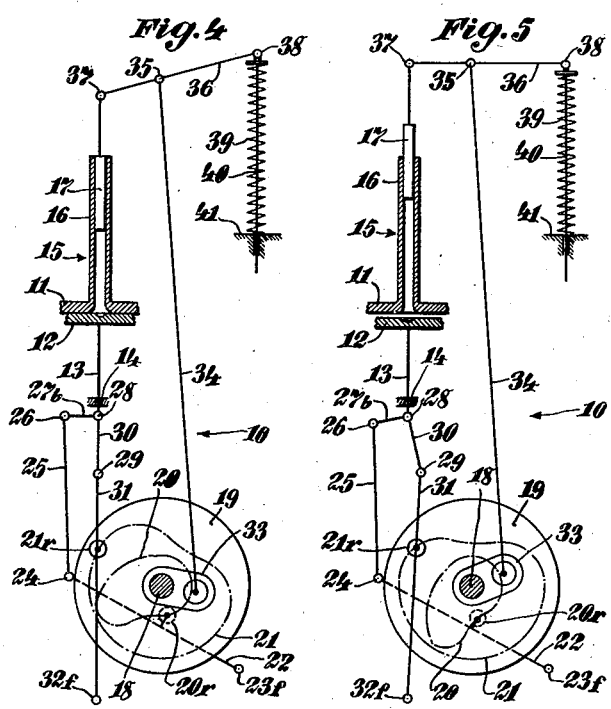
INVENTOR.
Peter De Mattia
Louis Schumacher
ATTORNEY.

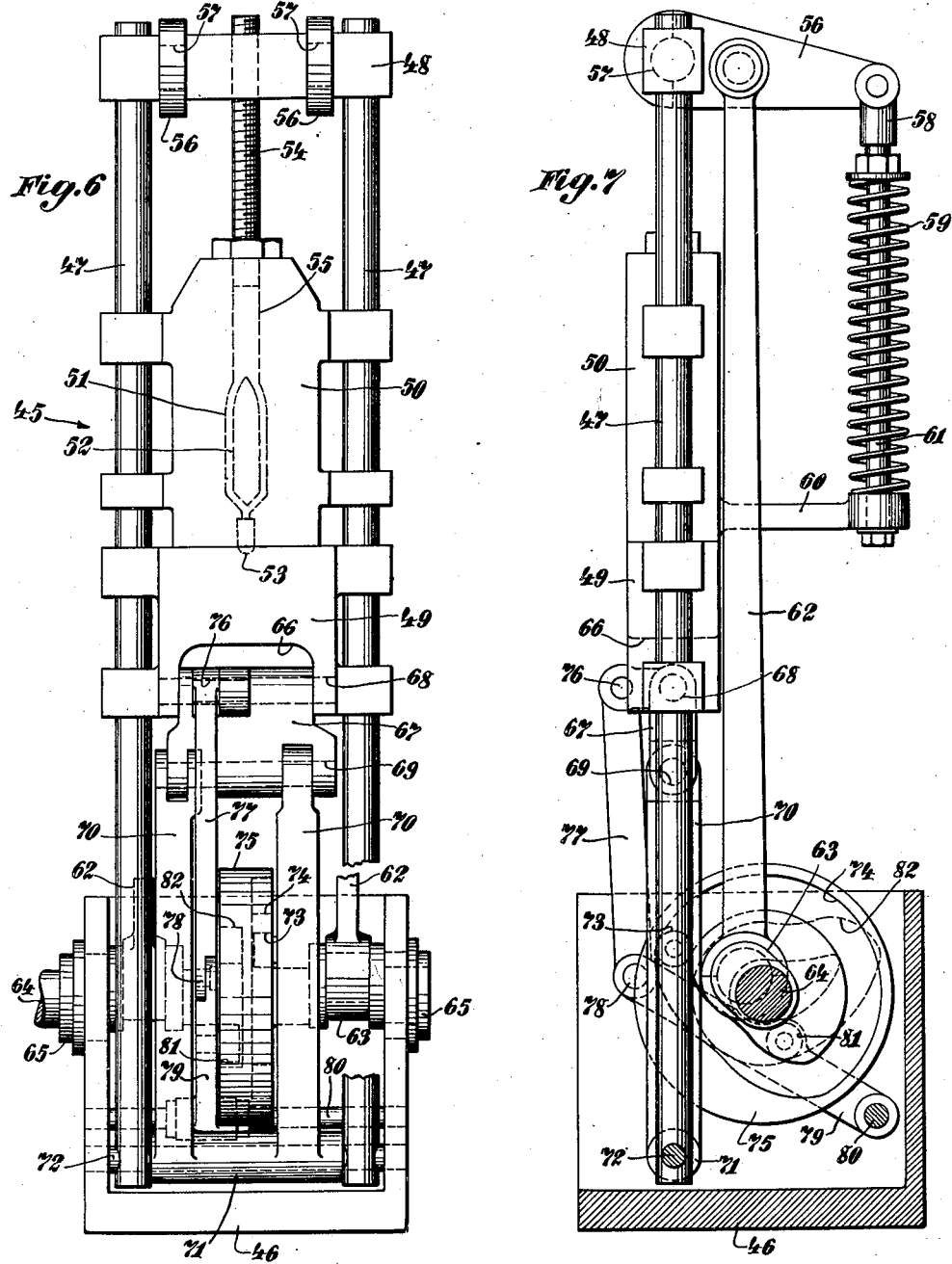

Patented Jan. 27, 1942

2,271,019

UNITED STATES PATENT OFFICE 2,271,019

INJECTION MOLDING MACHINE OR SIMILAR PRESS

Peter De Mattia, Passaic, N. J.

Application July 17, 1940, Serial No. 345,891

8 Claims. (Cl. 74—53)

This invention relates to injection molding machines and similar presses or apparatus.

One object of the invention is to provide improved power or drive means for translating rotary motion into a powerful lineal motion by simple highly compact means, preferably operated or controlled by a single shaft.

Another object of the invention is to provide an injection molding machine or other apparatus having a plurality of parts movable into engagement with each other to form an article according to one or more correctly timed operations, actuated and controlled by a single or unitary rotary shaft means.

A further object of the invention is the provision of an apparatus having a slidable element and a plurality of link means, the first of which initiates movement of the element and the second of which causes a final application of power to the element and functions as a lock for the element, and the first link means being operative to break the lock, all according to an improved coordination and arrangement for greatly diminishing the cost of the apparatus.

In machines for the injection molding of plastics, powerful forces are required, first, to close the die in a liquid-tight manner, and, second, to impose pressure on the plasticized material for injection thereof into the die at such speed as to cause accurate molding despite the water-cooled condition of the die. As is well known in the art, this required the use of a very heavy and powerful structure which made such machines expensive. Aggravating this difficulty was the fact that a particular cycle was required in the operation of the die and of the injection piston, because this necessitated considerable mechanism, which rendered the machine correspondingly expensive. This illustration is intended to indicate one type of machine to which the invention is well adapted, in solving the difficulties mentioned, as evidenced by machines now actually in use in accordance with the invention.

Generally described, the invention provides a member or platen movable along a fixed upright path, and a single shaft carrying cam means for causing an upward and downward movement of said member including a dwell period in the upward position of the member, all during a single rotation of the shaft and of the cam means carried thereby. To effect a powerful movement of the member at the end of its upward travel, a toggle arrangement is employed which is straightened out by a portion of the cam means. In order to obtain a substantial range of movement of the said member and to keep the mechanism nevertheless compact, the said toggle arrangement alone is insufficient because it would be excessive in size. Hence a lifting means must be employed to lift the member during the initial part of its upward travel, at which time the toggle is broken at a sharp angle for compactness and hence is inoperative by its cam portion. To operate this lifting means from another cam portion on the same shaft it is necessary that the follower shall not work along an upright portion of the cam. Hence the cam portions must perform their work at angularly spaced points, the lifting means being hence a linkage operative by a momentarily generally horizontal cam portion, and the toggle being operative by a cam portion that extends in a momentarily upright position at a suitable inclination. These cam portions may each be continuous to effect a coordinated operation throughout of the toggle and of the linkage, with these being interconnected by a novel arrangement including a bell crank. The cams may also break the toggle from dead center position directly or indirectly by means of the linkage. The same shaft may actuate a feeder piston during the dwell in the position of said member.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawings:

Figures 1 to 5 are diagrammatic views of an apparatus embodying the invention, and illustrating successive movements according to one possible cycle of the apparatus.

Fig. 6 is a front view in elevation showing an injection molding machine according to the invention, with parts removed and parts in section, and other parts in dot-dash lines.

Fig. 7 is a view in side elevation thereof, with parts removed and parts in section.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawings, therefore, are submitted merely as showing the preferred exemplification of the invention.

Referring in detail to the drawings, 10 denotes an apparatus such as an injection molding machine embodying the invention, according to a diagrammatic view thereof. The same may include a press or die which may comprise a fixed upper die member 11, and a movable lower die member 12. The latter may have a rigid bar or section 13 slidable in a fixed vertical guide 14 for movement of the die member 12. If desired, an at least partially movable means 15 may cooperate with one of the die members, such as the die member 11, the same preferably including a fixed cylinder 16 and a piston 17 reciprocable thereon. When the die 11, 12 is closed, as shown in Fig. 4, the piston is depressed to cause a flow of molten plastic from the heated cylinder 16 through the die member 11 and hence into the die 11, 12.

The operating means, according to the invention, may comprise a single rotary shaft 18 driven by any suitable source of power, not shown. Fixedly mounted on said shaft is a rotary cam means or member 19, which may have cam grooves at 20, 21 formed at opposite faces of the cam member. A follower roller 20r engaged in the cam groove 20 may be mounted on a lever 22. The latter may have a fixed pivot at 23f, and at 24 there is connected thereto a link 25 whose upper end is pivotally connected at 26 to a bell crank lever 27b. The latter is pivotally connected at its apex at 28 to the slidable section 13 of the movable die 12.

Pivotally connected at 29 to the long arm 30 of the bell crank lever 27b is an arm or lever 31 carrying a follower roller 21r engaged in the cam groove 21. At its lower end, the lever 31 has a fixed pivot 32f.

Fixed on the shaft 18 is a crank 33 or other suitable means connected to a rod 34 which is pivotally connected at 35 to an arm or lever 36. One end of the latter is pivotally connected to the piston 37 and the other end 38 thereof is pivotally carried by a coil spring 39. Preferably the end 38 is pivotally connected to a central guide bar 40 which is slidable in a fixed guide 41 upon which the lower end of the spring rests. This spring 39 may be regarded as initially tensioned in compression.

The cycle of operation will now be described. With the single rotary means 19 turning in the direction of arrow 42, operation begins from the open position of the die 11, 12 shown in Fig. 1. First the die member 12 must be raised to cause the bell crank lever 27b to swing to the position shown in Fig. 2. To accomplish this, the cam 20, engaging roller 20r, swings the lever 22 upward about its fixed pivot 23f, thereby moving the link 25 upward; simultaneously the cam 21, engaging the roller 21r moves the same toward the left to swing the lever 31 about its fixed pivot 32f to thus swing the bell crank to the position shown in Fig. 2. This action is made possible by the co-operation of two factors, first, the coordination of the cams 20, 21 and of their respective levers or links, and second, the upward movability of the bell crank 27b coincident with its swinging motion. This compound motion of the bell crank causes it to automatically float and raise the lower die member 12. While this is occurring, the crank 33 causes upward movement of the link 34, but this need not cause any material movement of the piston 17, because the compressed coil spring 39 moves upward so that the lever 36 has a combined swinging and bodily upward movement. Thus the lever 36 is floating.

Fig. 2 also illustrates the start of the final die closing action, which is a vital factor herein, because of the great multiplication of force effected to tightly close the die 11, 12. This final closing action is characterized by a rapid powerful impulse exerted by the portion 21a of the cam 21 acting on the arm 31 by means of the roller 21r, whereby the bell crank 27b is swung to the locked position shown in Fig. 3. While this is being done, the cam 20 is still causing the link 25 to be raised to compensate for the swing of the bell crank and for the bodily upward movement thereof. Simultaneously the link 34 returns to its initial position.

In the locked position referred to and shown in Fig. 3, the long arm 30 of the bell crank is in accurate alinement with the die section 13 and the fixed pivot 32f of the arm 31. If desired, it may be slightly, say several thousandths of an inch, past dead center. The arms 30, 31 thus constitute a toggle which is expansible to a locking dead center position. The die 11, 12 is locked closed under extreme power, and the injection stroke may now begin.

To accomplish the injection stroke, the shaft 18 must continue its rotation, as indicated in Fig. 4, so that the crank 33 shall pull downward on the link 34 to actuate the lever to cause a downward power stroke of the piston 17 in the cylinder 16 for causing plastic material in the latter to be fed to the die 11, 12. In this operation, some power may be stored in the spring 39, but primarily the latter acts as a floating pivot for the lever 36 for automatic accommodation of the piston action of the cycle as a whole. While the injection stroke is occurring, the die 11, 12 must be maintained closed, and hence the cams 20, 21 are constructed to provide dwells which are of course concentric with the shaft 18.

After the article has been molded, the die begins to open, as indicated in Fig. 5. To accomplish this, the locking action must be broken, and this may be accomplished by the cam 21 retracting on the lever 31 to swing the bell crank arm 30 out of the alined position, and with the cam 20 causing or permitting downward movement of the linkage 22, 25. Or, preferably, the cam 20 may act on its linkage to break the toggle 30, 31 from its dead center position. It will be understood that in the design of the cams 20, 21 certain parts of both may snugly engage the rollers and other parts may be mere cut outs for accommodation of the rollers, because of the interconnection at the bell crank lever.

As the opening of the die continues, the apparatus returns to the position of Fig. 1, at which the molded article is removed during a dwell in the position of the die, or during a time interval at which the drive shaft 18 is momentarily stationary.

It will be perceived that since the rollers of the cams 20, 21 are spaced about 90 degrees apart, these concentric cams are adapted to act in like directions, so that one causes an upward lifting force and the other a lateral toggle expanding force, with the interconnected mechanism held against slippage by the cams.

In Figs. 6 and 7 is shown an injection molding machine 45 constructed according to the invention shown in Figs. 1 to 5. The same may include a base 46 to which are secured a pair of vertical guide bars 47. Slidable along these bars 47 is the cross head 48 and the lower die member 49. Fixed on these bars is the upper die member 50, which may have a heated chamber 51 for the plastic, and a central core 52, the annular space therebetween leading to a nozzle 53. The piston 53 sliding in a cylinder 55 feeds plastic to the chamber 51, and causes it to be ejected at 53 at high pressure into a cavity formed between the dies 49, 50. This may be regarded as conventional construction.

The piston 54 may be secured to the cross head 48 which may be reciprocated up and down by a pair of levers 56 pivoted to the cross head at 57, and pivotally connected to a head 58. The expansion coil spring 59 may bear between the head 58 and a bracket arm 60 secured to the die member 50 and affording a guide for the rod 61 that is fixed to the head. The link 62 may connect the arm 56 with a crank 63 of the shaft 64 which may be journaled in bearings 65 mounted on the base 46.

Formed in the lower part of the die member 49 is a cut out 66 for receiving a bell crank lever 67 which is pivoted to the said die member at 68. Pivotally connected to the bell crank lever at 69 are a plurality of arms or levers 70 which are rigidly interconnected at their lower ends at 71, at which they are pivoted on a shaft 72 mounted on the base 46. One of these levers 70 may carry a roller 73 riding in a groove 74 in one face of a cam wheel 75 fixed on the shaft 64. Connected pivotally to the other end of the bell crank 67 as at 76, is a link 77 connected at 78 to an arm 79 having at 80 a fixed pivot on the base 46. Carried by arm 79 is a roller 81 engaging a cam groove 82 on the opposite face of the cam wheel. It is noted that the reason for offsetting one of the arms 70 as shown is to afford clearance space for the link 77 and arm 79. The structure affords two arms 70 to carry the load, whereas only one link 77 is required for the lesser stress involved, and only one link 62 need be used, as shown. The structure of the machine 45 follows that disclosed in Figs. 1 to 5 including the mode of operation and cycle thereof.

It will be apparent that the invention can be used for machines other than injection molding machines, and is applicable to presses and may be regarded in a sense as involving primarily a power multiplying mechanism or mechanical movement. The essential utility thereof is perhaps best exemplified with injection molding machines, because this simple, one shaft structure practically directly operates the entire apparatus according to a particular cycle, and develops the unusual forces required.

I claim:

1. A device including a member movable along a lineal path, a bell crank lever pivotally connected at its apex to said member at said path, a power lever pivotally connected at one end to a first arm of the bell crank lever, and having at its other end a fixed pivot along a line straight with said path, said power lever and said first arm of the bell crank being movable so that their pivotal connection lies along said line or in spaced relation thereto, a linkage pivotally connected at one end to the second arm of the bell crank and having a fixed pivot at its other end, a rotatable shaft, a first cam and a second cam having positive engagement with the power lever at one point, the second cam having positive engagement at one point with said linkage to actuate the same for swinging and raising the bell crank lever to raise said member, the points of engagement of the first and second cam being angularly spaced, said cams being so arranged and coordinated that the second cam causes the linkage to elevate the movable member and to swing the bell crank lever so that said first arm thereof moves toward said line with the second cam simultaneously moving the power lever toward said line to swing and raise the bell crank lever to raise said member and to cause the connection between the power lever and the second arm to lie in said line for a substantially dead center position, and said cams being constructed to cooperate with said power lever and with said linkage to cause a reverse swinging of the bell crank lever and a lowering thereof to lower the said member.

2. A device including a member reciprocable along a lineal path, a bell crank lever pivotally connected at its apex to said member at said path, a power link having a fixed pivot at one end and being pivotally connected at its other end to an arm of the bell crank to form a toggle with said arm, a linkage having links at an angle to each other, said linkage having a fixed pivot at one end and being pivotally connected at its other end to the other arm of the bell crank, a rotary shaft having a plurality of cams fixed thereon, one of the cams being engaged with said power link and the other cam being engaged with a link of said linkage so that the points of engagement of the different cams are substantially angularly spaced, said power link and linkage being so coordinated with said cams as to cause oscillation of the bell crank and reciprocation of the bell crank and said member upon rotary movement of the cams in one direction, with the toggle moving into and out of dead center position.

3. A device including a member reciprocable along a lineal path, guide means for said member, and mechanis mfor actuating the member comprising a toggle having at one end a fixed pivot and being movable into and away from dead center position for reciprocating said member, means pivotally engaged at one end to said member comprising a linkage having a fixed pivot at the other end of said means, said linkage comprising a first link extending in the direction of said path and a second link at a substantial angle to the first link, a shaft having a plurality of cams fixed thereon, said cams being located within the angle formed by said linkage, one cam having engagement with an arm of said toggle and the other cam having engagement with the said second link, whereby the linkage causes an initial movement of said member and the toggle causes a final powerful movement of said member as the toggle moves into dead center position.

4. A device including a member reciprocable along a lineal path, guide means for the member, and mechanism for actuating the member including a power lever having a fixed pivot at one end thereof, a linkage comprising a first link and a second link, the linkage having a fixed end pivot at an end of the second link, the first link and the lever extending in the same general direction, the second link being at an angle to the first link, a shaft, a plurality of cams thereon mounted to rotate as a unit, one cam having engagement with the power lever, the other cam having engagement with the second link, and a bell crank lever interconnecting the said member with the other end of the power lever and with the otherwise free end of said linkage, said cams being so coordinated with said linkage and with said lever as to cause simultaneous oscillation and reciprocation of the bell crank lever to cause reciprocation of said member along said path.

5. A device including a member reciprocable along a lineal path, guide means for the member, and mechanism for actuating the member comprising a bell crank lever connected to said member, a power lever having at one end a fixed pivot and being pivotally connected at its other end to the bell crank lever to act as a toggle with an arm of the latter, for causing reciprocation of the member, an element elongated and movable along said path and being simultaneously oscillatable in course of reciprocation of said member, said element having pivotal connection with the bell crank lever at a point remote from the pivotal connection of the bell crank with the power lever, a plurality of cams rotatable as a unit about a fixed axis, one of said cams engaging the power lever to move the toggle in a direction transverse to said path for causing the toggle to move toward and away from a dead center position, means coacting with the other cam and said element to cause movement in the direction of said path, said cams being so coordinated with said element and said power lever as to cause oscillation of the bell crank lever and simultaneously bodily movement thereof for reciprocation of said member by said bell crank lever, said bell crank lever being actuable by said element under operation of a cam to coact with the toggle for movement thereof away from dead center position, and said element being actuatable by its cam to cause an initial upward movement of the bell crank lever in coordination with the power lever so that the toggle can subsequently move toward dead center position for causing further movement of the member.

6. A device including a member reciprocable along a lineal path, guide means for said member, and mechanism for actuating the member comprising a toggle having at one end a fixed pivot and being movable into and away from dead center position for reciprocating said member, means pivotally engaged at one end to said member comprising a linkage having a fixed pivot at the other end of said means, said linkage comprising a first link extending in the direction of said path and a second link at a substantial angle to the first link, a shaft having a plurality of cams fixed thereon, one cam having engagement with an arm of said toggle and the other cam having engagement with the said second link, whereby the linkage causes an initial movement of said member and the toggle causes a final powerful movement of said member as the toggle moves into dead center position.

7. A device including a member reciprocable along a lineal path, guide means for the member, and mechanism for actuating the member including a power lever having a fixed pivot at one end thereof, a linkage comprising a first link and a second link, the linkage having a fixed pivot at an end of the second link, the first link and the lever extending in the same general direction, the second link being at an angle to the first link, a shaft, a plurality of cams thereon mounted to rotate as a unit, one cam having engagement with the power lever, the other cam having engagement with said linkage to cause a movement of the first link in said general direction for actuation of said member, and a bell crank lever interconnecting the said member with the other end of the power lever and with the otherwise free end of said linkage, said cams being so coordinated with said linkage and with said lever as to cause simultaneous oscillation and reciprocation of the bell crank lever to cause reciprocation of said member along said path.

8. A device including a member reciprocable along a lineal path, guide means for the member, and mechanism for actuating the member comprising a bell crank lever connected at one point to said member, a power lever having at one end a fixed pivot and being pivotally connected at its other end to the bell crank lever at a second point thereof to act as a toggle with an arm of the bell crank lever for causing reciprocation of the member, a shaft having a plurality of cams fixed thereon, one of said cams being engaged with said power lever, and means engaging the second cam with a third point on the bell crank lever to cause oscillation thereof, the said points being respectively at the apex and at the ends of the bell crank lever whereby an initial movement of said member is caused by the second cam with the toggle causing a final powerful movement of said member.

PETER DE MATTIA.